United States Patent Office 3,558,777
Patented Jan. 26, 1971

3,558,777
PHARMACOLOGIC PROCESSES AND COMPOSITIONS CONTAINING AZASPIRODECANEDIONES AND AZASPIROUNDECANEDIONES
Yao Hua Wu, Evansville, Ind., assignor to Mead Johnson & Company, Evansville, Ind., a corporation of Delaware
No Drawing. Continuation-in-part of application Ser. No. 607,908, Jan. 9, 1967, now Patent No. 3,398,151, which is a continuation-in-part of abandoned application Ser. No. 523,945, Feb. 1, 1966. This application June 21, 1968, Ser. No. 738,848
Int. Cl. A61k 27/00
U.S. Cl. 424—250                16 Claims

ABSTRACT OF THE DISCLOSURE

8 - (4 - phenyl - 1 - piperazinylalkylene)-8-azaspiro [4,5]decane-7,9-diones having up to three substituents in the phenyl ring and the corresponding 3-azaspiro[5,5]undecane-2,4-dione derivatives are useful in therapeutic processes in mammals where a psychotropic including tranquilizer, muscle relaxant, analgetic, anti-allergic, capillary protectant, anti-inflammatory, anti-emetic, hypothermic, or antipyretic action is required. The phenyl substituents are alkoxy, alkyl, alkylthio, halogen, $CF_3$, $NH_2$, alkanoamido, and alkylsulfonamido. Alkylene is from 2 to 6 carbon atoms and may contain —O— or —C≡C—.

This patent application is a continuation-in-part of my copending patent application Ser. No. 607,908 filed Jan. 9, 1967 now U.S. Pat. No. 3,398,151 which in turn is a continuation-in-part of Ser. No. 523,945, filed Feb. 1, 1966, and now abandoned.

This invention involves pharmacologic use of a group of novel substances having the following structural formula and the acid addition salts thereof, in the therapy of mammals having afflictions or defects for which the specific pharmacologic actions exerted by those substances are indicated for treatment, and compositions useful for therapeutic purposes

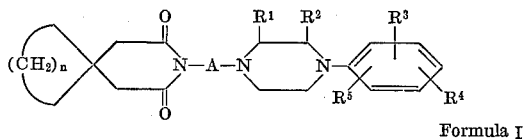

Formula I

In the foregoing structural formula, $n$ is the integer 4 or 5. The symbol —A— refers to a divalent open chain group which links the nitrogen atom of the azaspiro ring to the nitrogen atom of the piperazine ring through at least two carbon atoms. It may be an alkylene group, an oxalkylene group, or 1,4-but-2-ynylene.

The alkylene group contains from 2 to 6 carbon atoms in a straight or branched chain and is constructed of an alkane having two valences available for bonding to the nitrogen atoms as shown. The bonding may take place through two adjacent carbon atoms or through two more widely separated carbon atoms of the chain. Examples of alkylene groups are

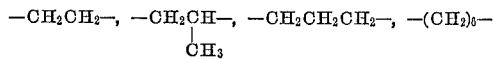

The oxalkylene group is similarly related to a dialkyl ether. That is, the oxalkylene group is an alkylene group containing an ether oxygen atom in the chain. The oxalkylene group contains 4 to 6 carbon atoms and is so constituted that neither of the carbon atoms involved in the ether-linkage serves as connection to the azaspiro nitrogen atom or the piperazine nitrogen atom; that is neither nitrogen-connecting carbon atom of the oxalkylene chain is linked to the oxygen atom thereof. A special instance of an —A— connecting group is the 1,4-but-2-ynylene group, —$CH_2C \equiv CCH_2$—.

$R^1$ and $R^2$ of Formula I are hydrogen atoms or methyl groups, the former being preferred. $R^3$, $R^4$, and $R^5$ are the same or different and are selected from hydrogen, lower alkoxy of up to 4 carbon atoms, lower alkyl of up to 4 carbon atoms, lower alkylthio of up to 4 carbon atoms, halogen, trifluoromethyl, nitro, amino, alkanoamido, or alkylsulfonamido each of up to 6 carbon atoms.

To assist in naming the present compounds, partial structures corresponding to the azaspirodecanedione and azaspiroundecanedione portions of Formula I are shown below with the positions numbered.

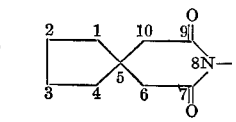 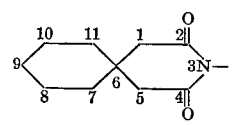

8-azaspiro[4,5]decane-
7-9-dione
Formula I, n=4

3-azaspiro[5,5]undecane-
2,4-dione
Formula I, n=5

Specific compounds which are employed in the present invention are listed below. Methods for the preparation of these compounds and their physical properties are disclosed in my copending application, Ser. No. 607,908 which is referred to above. The compounds listed are numbered to correspond to the example numbers of Ser. No. 607,908. They are referred to in the experimental portion of this application by these numbers.

Compound No.: Name (1) 8-[2-(4-phenyl - 1 - piperazinyl)ethyl]-8-azaspiro[4.5]decane-7,9-dione hydrochloride
(2) 8-[3-(4-phenyl - 1 - piperazinyl)propyl]-8-azaspiro[4.5]decane-7,9-dione hydrochloride
(3) 8-[4-(4-phenyl - 1 - piperazinyl)butyl]-8-azaspiro[4.5]decane-7,9-dione dihydrochloride
(4) 8-[5-(4-phenyl - 1 - piperazinyl)pentyl]-8-azaspiro[4.5]decane-7,9-dione dihydrochloride
(5) 3-[3-(4-phenyl - 1 - piperazinyl)propyl]-3-azaspiro[5.5]undecane-2,4-dione hydrochloride
(6) 3 - [2-(4-o-methoxyphenyl - 1 - piperazinyl) ethyl] - 3 - azaspiro[5.5]undecane-2,4-dione hydrochloride
(7) 8 - [2-(4-o-methoxyphenyl - 1 - piperazinyl) ethyl] - 8 - azaspiro[4.5]decane-7,9-dione dihydrochloride
(8) 8 - [3-(4-o-methoxyphenyl - 1 - piperazinyl) propyl]-8-azaspiro[4.5]decane-7,9-dione
(9) 8-[2-(4-m-tolyl - 1 - piperazinyl)ethyl]-8-azaspiro[4.5]decane-7,9-dione hydrochloride
(10) 8-[3-(4-o-chlorophenyl - 1 - piperazinyl)propyl]-8-azaspiro[4.5]decane-7,9-dione Compound No.: Name
(11) 8 - [3-(4-m-methoxyphenyl - 1 - piperazinyl) propyl] - 8 - azaspiro[4.5]-decane-7,9-dione hydrochloride
(12) 8-[3-methyl-4-(4-phenyl - 1 - piperazinyl)butyl] - 8 - azaspiro[4.5]-decane-7,9-dione dihydrochloride
(13) 8-[4-(4-o-methoxyphenyl - 1 - piperazinyl)butyl] - 8 - azaspiro[4.5]-decane-7,9-dione dihydrochloride
(14) 8-[4-(4-o-chlorophenyl - 1 - piperazinyl)butyl]-8-azaspiro[4.5]-decane-7,9-dione hydrochloride
(15) 3-[4-(4-o-methoxyphenyl - 1 - piperazinyl)butyl] - 3 - azaspiro[5.5]undecane-2,4-dione hydrochloride
(16) 8-[4-(4-o-tolyl - 1 - piperazinyl)butyl]-8-azaspiro[4.5]decane-7,9-dione hydrochloride
(17) 8-[3-(4-o-tolyl - 1 - piperazinyl)propyl]-8-azaspiro[4.5]decane-7,9-dione hydrochloride
(18) 8 - [5-(4-o-methoxyphenyl - 1 - piperazinyl) pentyl] - 8 - azaspiro[4.5]-decane-7,9-dione hydrochloride
(19) 8-[3-(4-p-tolyl - 1 - piperazinyl)propyl]-8-azaspiro[4.5]decane-7,9-dione dihydrochloride
(20) 8-[2-(4-p-tolyl - 1 - piperazinyl)ethyl]-8-azaspiro[4.5]decane-7,9-dione dihydrochloride
(21) 8-[2-(4-o-chlorophenyl - 1 - piperazinyl)ethyl]-8-azaspiro[4.5]decane-7,9-dione hydrochloride
(22) 8-[3-(4-m-chlorophenyl - 1 - piperazinyl)propyl] - 8 - azaspiro[4.5]decane-7,9-dione hydrochloride
(23) 8 - [2-(4-m-chlorophenyl-1-piperazinyl)ethyl]-8-azaspiro[4.5]decane-7,9-dione hydrochloride
(24) 8-[3-(4-p-chlorophenyl - 1 - piperazinyl)propyl] - 8 - azaspiro[4.5]decane-7,9-dione hydrochloride
(25) 8-{2-[1-(4-phenyl - 1 - piperazinyl)]propyl}-8-azaspiro[4.5]decane-7,9-dione dihydrochloride
(26) 8 - [3-(4-p-methoxyphenyl - 1 - piperazinyl) propyl] - 8 - azaspiro[4.5]-decane-7,9-dione hydrochloride
(27) 8-{2-[2-(4-o-methoxyphenyl - 1 - piperazinyl) ethoxy]ethyl} - 8 - azaspiro[4.5]-decane-7,9-dione dihydrochloride
(28) 8 - {2-[2-(4-phenyl - 1 - piperazinyl)ethoxy] ethyl} - 8 - azaspiro[4.5]-decane-7,9-dione hydrochloride
(29) 8-[3-(4-m-tolyl - 1 - piperazinyl)propyl]-8-azaspiro[4.5]decane-7,9-dione hydrochloride
(30) 8-[3-(3-methyl-4-phenyl - 1 - piperazinyl)propyl] - 8 - azaspiro[4.5]-decane-7,9-dione hydrochloride
(31) 8-[4-(4-o-fluorophenyl - 1 - piperazinyl)butyl]-8-azaspiro[4.5]decane-7,9-dione hydrochloride
(32) 8-[4 - [4 - (o-methanesulfonamidophenyl)-1-piperazinyl]butyl] - 8 - azaspiro[4.5]decane-7,9-dione hydrochloride
(33) 8-[4-(4-o-nitrophneyl - 1 - piperazinyl)butyl]-8-azaspiro[4.5]decane-7,9-dione hydrochloride
(57) 8-[4-(4-phenyl - 1 - piperazinyl)-2-butynyl]-8-azaspiro[4.5]decane-7,9-dione dihydrochloride
(58) 8-[4-(4-o-methoxyphenyl - 1 - piperazinyl)-2-butynyl] - 8 - azaspiro[4.5]-decane-7,9-dione dihydrochloride The compounds of Formula I are psychotropic agents, analgetics, centrally acting muscle relaxants, capillary protectants, anti-allergic agents, anti-inflammatory agents, anti-emetics, hypothermic and antipyretic agents. They may be administered orally, parenterally, or rectally in total daily doses ranging from about 0.02 to 40 mg./kg. of body weight. For this purpose they may be formulated as tablets or capsules containing from about 1.0 to 200 mg. thereof, as injectable ampoules containing from 1.0 to 100 mg./ml. of compound in solution or suspension, or as suppositories containing from 2.5 to 500 mg. of one of the present substances.

For pharmaceutical purposes the compounds themselves may be employed as the free bases or as pharmaceutically acceptable acid addition salts. By pharmaceutically acceptable acid addition salt is meant a salt of one of the present bases in which the anionic portion is pharmaceutically compatible. For example the anion should not contribute appreciably to the toxicity of the resulting salt nor should it have chemical properties inconsistent with the chemical properties of the base resulting in an inherent instability. Suitable anions include chloride, bromide, iodide, phosphate, sulfate, nitrate, citrate, succinate, acetate, propionate, butyrate, tosylate, mesylate, lauryl sulfate, tannate, pamoate, and others known to the art as satisfactory for use with basic drugs.

Psychotropic action.—The shuttle box technique described by J. R. Albert in The Pharmacologist 4, 152 (1962) and by L. E. Allen and J. R. Albert in The Pharmacologist 4, 152 (1962) is a test designed to differentiate tranquilizing drugs from nonspecific sedative hypnotic drugs. The apparatus employed is a box having a 6 in. barrier dividing the floor thereof into two equal portions. The floor of the left side of the box contains an electrified grid floor. The other side, or safe side, is not electrified. A group of rats is trained by placing them individually into the electrified portion of the box and administering a foot shock which causes the rat to jump the barrier to the safe side of the box. Trained rats without fail will jump the barrier on being placed into the left side of the box within 30 sec. without foot shock.

Each animal of the group of trained animals is then administered a dose of test drug intraperitoneally, and that dose of drug is determined by interpolation from a dose response curve which reduces the aggregate number of conditioned avoidance responses for the group by 50%. In other words, a group of 5 trained animals without drug treatment will exhibit 50 correct conditioned avoidance responses (CAR) by jumping over the barrier prior to foot shock when placed in the left side of the box for 10 repeated trials during a one-half hour period. When treated with an $ED_{50}$ dose of a tranquilizing drug, the number of correct responses for the same group is reduced to 25.

When a treated animal fails to jump the barrier within 30 sec. after being placed in the left side of the box, the foot shock is administered. If the animal then jumps the barrier, it is concluded that the drug treatment prevented only the conditioned avoidance response. Those animals which fail to jump the barrier after a 30 sec. shock are said to have their unconditioned escape response (UER) blocked. In other words, the drug treatment has so affected the animal as to make him insensitive to the shock or incapable of jumping the barrier to escape the foot shock.

That dose of test compound which results in failure of the unconditioned escape response in 50% of the animals is referred to as the $ED_{50}$ value for unconditioned escape response. The ratio of these two values, that is the UER–$ED_{50}$ to the CAR–$ED_{50}$ value is indicative of the so-called tranquilizer selectivity of the drug's action. For tranquilizer drugs a value in excess of 1 is obtained. The greater the value the more selective the drug with respect to tranquilizer action as differentiated from sedative or hypnotic action.

Chlorpromazine hydrochloride has a CAR–$ED_{50}$ value of 3.3 mg./kg., a UER–$ED_{50}$ value of 9.8 mg./kg., both by intraperitoneal administration, giving a ratio of 3.0. The values obtained for a number of compounds of this invention are given in Table I.

TABLE I.—CONDITIONED AVOIDANCE RESPONSE

| Compound No. | UER-$ED_{50}$ (mg./kg.) | CAR-$ED_{50}$ (mg./kg.) | Ratio |
|---|---|---|---|
| Chlorpromazine hydrochloride | 9.8 | 3.3 | 3.0 |
| Meprobamate | 150 | 153 | 1.0 |
| 1 | >103 | 25.6 | >4.0 |
| 2 | 73.1 | 38.6 | 1.9 |
| 3 | >50 | 8.6 | 5.8 |
| 4 | 29.1 | 20.6 | 1.4 |
| 6 | >117 | 38.7 | >3.0 |
| 7 | 26.4 | 9.2 | 2.9 |
| 8 | 38.2 | 12.5 | 3.1 |
| 9 | >157 | 39.3 | >4.0 |
| 10 | >140 | 35 | >4.0 |
| 11 | >50 | 41 | >1.2 |
| 13 | 2.8 | 2.4 | 1.2 |
| 14 | 25 | 11 | 2.3 |
| 15 | 8.6 | 5.4 | 1.6 |
| 16 | 28 | 16 | 1.7 |
| 18 | 17.7 | 16.7 | 1.1 |
| 26 | 42.3 | 26.6 | 1.6 |
| 27 | 27 | 18 | 1.5 |
| 28 | 43 | 39.3 | 1.1 |
| 31 | 17.5 | 8.5 | 2.1 |
| 32 | >50 | ca. | >1.2 |
| 33 | 25.9 | 12.4 | 2.9 |

The antagonism of amphetamine aggregation stress is another test used to evaluate tranquilizer drugs. It is designed to detect drugs that will antagonize the increased toxicity of amphetamine observed when housing a number of animals treated with it in a single cage as opposed to measuring amphetamine toxicity in animals housed individually. A phenomenon of increased toxicity is observed with DL-amphetamine sulfate when measured under the grouped condition. Tranquilizer drugs have the capacity of alleviating the increased toxic effect of amphetamine on the grouped animals.

According to this test, groups of 10 male mice weighing 18–28 g. are administered various dose levels of the test compound subcutaneously. The mice are segregated into individual cages for 60 min. and then injected subcutaneously with 20 mg./kg. of DL-amphetamine sulfate (the $LD_{99.9}$ dose) and aggregated into groups of 10 mice per cage. The number of deaths is recorded after 24 hrs. The percent surviving at each dose is plotted and the $ED_{50}$ value to produce 50% survival is calculated. For the tranquilizer drug chlorpromazine hydrochloride, an $ED_{50}$ of 0.26 is recorded.

The results obtained with compounds of this invention are shown in Table II.

TABLE II

Antagonism of amphetamine aggregation stress

| Compound No.: | $ED_{50}$ (mg./kg.) |
|---|---|
| Chlorpromazine hydrochloride | 0.26. |
| Meprobamate | Not active at 250. |
| 1 | 31.8. |
| 2 | 1.4. |
| 3 | 3.6. |
| 4 | 8.6. |
| 5 | 3.9. |
| 6 | 12.6. |
| 7 | 2.2. |
| 8 | 4.4. |
| 10 | 4.8. |
| 12 | 5.9. |
| 13 | 0.4. |
| 14 | 1.2. |
| 15 | 0.4. |
| 16 | 1.5. |
| 17 | 5.0. |
| 18 | 0.9. |
| 27 | 6.4. |
| 29 | 10.8. |
| 31 | 0.9. |

Compound No. 7 is preferred for tranquilizer use in treating mental and emotional problems. An oral dose of from 0.5 to 25 mg./kg. of body weight per day is appropriate. Other preferred substances are Compound Nos. 14 and 31.

Analgetic actions.—Compounds of Formula I are highly active agents in preventing the phenylquinone writhing syndrome in mice. The method of Hendershot and Forsaith, J. Pharmacol. Exp. Therap. 125, 237 (1959) was used to measure this effect. According to this test, groups of 10 to 20 mice are injected subcutaneously with graduated doses of the test compound. At the time of peak effect, as previously determined, the animals are administered a dose of 2.5 mg./kg. of phenylquinone intraperitoneally. The latter injection produces writhing episodes in mice. The number of such episodes exhibited by each mouse during the 10 min. period following injection is counted and the average percent decrease in the number of episodes as compared to a control group of mice is recorded for each dose of test compound. A log dose-response curve is prepared and the dose of test compound required to decrease the number of writhing episodes by 50% is estimated by interpolation. The results for several compounds of the present invention are listed in Table III.

TABLE III

Prevention of phenylquinone writhing

| Compound No.: | $ED_{50}$ (mg./kg.) |
|---|---|
| Aspirin | 48.2 |
| Codiene sulfate | 3.0 |
| 1 | 12.0 |
| 2 | 9.8 |
| 3 | 2.4 |
| 4 | 4.0 |
| 5 | 5.0 |
| 6 | 5.1 |
| 7 | 3.5 |
| 8 | 2.8 |
| 10 | 2.9 |
| 12 | 32.0 |
| 13 | 0.6 |
| 14 | 0.8 |
| 15 | 0.4 |
| 16 | 0.8 |
| 18 | 0.8 |
| 19 | 3.2 |
| 28 | 8.4 |
| 32 | 18.5 |

Anti-inflammatory capillary protectant, and anti-allergic action.—Another of the pharmacologic effects exhibited by compounds of Formula I is the ability to inhibit formation of the local edema which forms on plantar injection of formalin into the foot of a rat according to a standard screening test for anti-inflammatory agents (C. A. Winter "International Symposium on Non-Steroidal Anti-inflammatory Drugs," International Congress Series No. 82, Excepta Medica Foundation, 1965, pp. 190–202).

The test is performed on adult rats of either sex using a group of five animals as non-medicated controls and another group of five which is treated subcutaneously or orally with the test compound 15 min. prior to induction of edema. Edema is induced by the plantar injection of formalin, 0.1 ml. of a 4% solution, into the right hind foot. The left hind foot is treated similarly with 0.1 ml. of 0.9% saline. One hour later the volume of each hind foot is determined plethysmographically by measuring the volume of mercury displaced. The amount of edema is expressed as the percent increase in volume of the formalin-injected foot over the saline-injected foot. The percent inhibition of edema is calculated by multiplying the mean percent increase in edema by 100 and subtracting the product from 100. Various doses of test compound are evaluated and the $ED_{50}$ value is determined by interpolation from a dose response curve. The $ED_{50}$ is that dose which reduces the edema by 50%. Table IV contains the $ED_{50}$ doses determined for a number of compounds of the present invention against formalin edema.

TABLE IV

Inhibition of formalin edema

| Compound No.: | $ED_{50}$ (mg./kg.) |
|---|---|
| Methdilazine | 64 |
| 1 | 21 |
| 2 | 9.3 |
| 3 | 13 |
| 4 | 13 |
| 5 | 32 |
| 6 | 37 |
| 7 | 17 |
| 10 | 5 |
| 12 | 29 |
| 13 | 8 |
| 14 | 1.4 |
| 15 | 0.9 |
| 16 | 3.5 |
| 18 | 5.2 |
| 19 | 28 |
| 27 | 18 |
| 28 | 18 |
| 31 | 1.6 |
| 33 | 16 |
| 58 | 12.5 |

Other agents may also be employed in this test to induce the edema. The present compounds have been found to be active in inhibiting the edema produced by injection of 0.1 ml. of a solution containing 10 mcg. of serotonin, 300 mcg. of histamine, or 0.1 ml. of a 0.5% solution of carrageenin. Compound No. 10 is the preferred substance for anti-allergic (antihistamine) and anti-inflammatory or capillary protectant use. In the foregoing test employing histamine challenge, its $ED_{50}$ value was 3.3 mg./kg. by oral treatment. This substance is also effective when daily oral doses of 25 mg./kg. of body weight are administered over a period of 21 days to rats in which adjuvant arthritis has been induced. (Newbould, Brit. J. Pharmol. 21, 127 (1963)).

Skeletal muscle relaxant action.—Compound No. 15 is the preferred member of the present class of substances for this action. Its ability to selectively inhibit polysynaptic reflexes without interfering with monosynaptic reflexes was measured according to an accepted method employing an intact cat anesthetized with α-chlorolose. In this test a dose of 8.0 mg./kg. of body weight of compound 15 was found to be approximately equivalent in effect to a dose of 25.0 mg./kg. of body weight of mephenesin by the intravenous route. Mephenesin is a well-known muscle relaxant drug. The test method involved administering various doses of test compound to the animal at different times while stimulating the linguomandibular and patellar reflexes and observing the animal for the presence or absence of the reflex, respectively opening of the jaws or knee jerk. The linguomandibular reflex, a polysynaptic reflex, was stimulated by means of an electric shock to the tongue and the patellar reflex, a monosynaptic reflex, by tapping the pateller tendon. A dose of 8.0 mg./kg. of Compound No. 15 intravenously caused 62.5% inhibition of the linguomandibular reflex. Mephenesin in a dose of 25.0 mg./kg. intravenously for comparison resulted in 78.6% reduction in the linguomandibular reflex. Neither compound effected the petaller reflex. In a similar experiment using the unanesthetized spinal cat and comparing the crossed extensor reflex as an example of a polysynaptic reflex with the patellar reflex, Compound No. 15 in a dose of 6.25 mg./kg. intravenously elicited substantially the same effect as 25 mg./kg. of mephenesin.

Anti-emetic action.—A standard method involving the measurement of the ability of a test compound to antagonize apomorphine-induced emesis in dogs was used to evaluate the anti-emetic activity of a number of the compounds with which the present invention deals. Each dose of each compound was given intravenously to 3 dogs. Fifteen minutes later apomorphine hydrochloride was administered subcutaneously in a dose of 0.5 mg./kg. of body weight. All animals were observed for the next 30 minutes. The effectiveness of the test dose was judged on the basis of both its ability to completely block vomiting and also by its ability to relieve the emetic condition by reducing the frequency of vomiting. The reaction of the dogs employed in the tests had been previously established with reference to emesis in response to the dose of apomorphine employed. Dose response curves were prepared and employed to establish $AED_{50}$ values. With respect to all-or-none response, the $AED_{50}$ value is that approximate dose which eliminates vomiting completely in one-half of the dogs. With respect to frequency, the $AED_{50}$ value is that approximate dose which reduces the frequency of vomiting to 50% of the previously established control value. The results obtained are arranged in Table V.

TABLE V.—APOMORPHINE-INDUCED EMESIS IN DOGS

| Compound No. | All-or-none ($AED_{50}$, mg./kg.) | Frequency ($AED_{50}$, mg./kg.) |
|---|---|---|
| 6 | 2.85 | 1.44 |
| 7 | 1.12 | 0.56 |
| 8 | 3.57 | 1.58 |
| 13 | 0.41 | 0.14 |
| 14 | 1.77 | 0.53 |
| 16 | 2.1 | 1.38 |
| 27 | 3.52 | 3.36 |
| 32 | 4.2 | <2.5 |
| Chlorpromazine | 1.32 | 0.148 |

The preferred substances for this use are Compound Nos. 6 and 7. A dose of the former of from 2 to 6 mg./kg. of body weight per day and of the latter of 1 to 3 mg./kg. of body weight per day would be appropriate.

Tablets.—The following materials are blended in a twin-shell blender and then granulated and compressed into tablets weighing 250 mg. each. Each tablet contains 50 mg. of active ingredient.

| | G. |
|---|---|
| Compound No. 7 | 50.0 |
| Magnesium stearate | 1.3 |
| Corn starch | 12.4 |
| Corn starch pregelatinized | 1.3 |
| Lactose | 185.0 |

Solution for injection.—A sterile solution for intravenous injection is prepared by dissolving 20 g. of Compound No. 6 in 2 l. of water for injection, U.S.P. The solution is adjusted to pH 4.2 with 0.1 N sodium hydroxide. The solution is stearlized by passage through a bacteriological filter and aseptically filled into 10 ml. glass ampoules, each containing 50 mg. of active ingredient.

Hypothermic, anti-pyretic action.—Compounds having hypothermic action are sometimes used in surgery. This action was demonstrated in animals employing Compound No. 7. Several groups of 10 male albino rats each were arranged and fasted overnight. The next morning rectal body temperatures were recorded at the outset of the experiment just prior to drug administration. One group was given water and served as a control and doses of 10, 30 and 100 mg./kg. of body weight of Compound No. 7 were administered orally to the animals of three other groups. A reduction in body temperature of 3.1° F. was observed in the animals receiving 10 mg./kg., and 4.4° F. in the group of animals receiving 30 mg./kg. both after 1 hr. A dose of 100 mg./kg. caused a reduction in body temperature of 6.2° F. after 1 hr. In each instance body temperature commenced to increase within 1 additional hr., and returned to normal within 6 to 8 hrs. In a similar experiment with chloropromazine, a drug of established hypothermic action, 10 mg./kg. orally in rats caused a reduction in body temperature of 6.9° F. after 2 hrs. Although chlorpromazine is more potent on a weight basis than Compounod No. 7, the latter has the advantage of having a quicker onset of action and a shorter duration of action, features which facilitate the management of the test subject.

For evaluation of Compound No. 7 as an anti-pyretic agent an experiment with rats was conducted in which a fever was induced by subcutaneous injection of 10 ml. of a 15% suspension of brewers' yeast in physiologic saline solution. In this experiment two control groups were used, one normothermic which received normal saline rather than the brewers' yeast suspension and one hyperthermic which received the brewers' yeast suspension to induce the fever but no drug treatment. Groups of 8 animals each were used for evaluation of each dosage level of test drug and for each control group. Again, all animals had been fasted overnight prior to the experiment. Rectal temperatures were recorded at the outset. Drug treatment was administered 5 hrs. after injection of the brewers' yeast to allow time for a fever to develop. Body temperatures were recorded for all test groups at hourly intervals following drug treatment. A dose of 30 mg./kg. of body weight of Compound No. 7 administered orally was sufficient to reduce the induced fever to a normal body temperature. A larger dose, 100 mg./kg., actually induced a hypothermic effect of 2.5° F. This dose of Compound No. 7 was found to be more potent and quicker acting than aspirin, a dose of 125 mg./kg. of the latter being slower in onset of action but sufficient to restore a normothermic condition.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. The process for eliciting a pharmacologic action selected from the group consisting of psychotropic, analgetic, muscle relaxant, capillary protectant, anti-allergic, anti-inflammatory, anti-emetic, hypothermic, and anti-pyretic in a mammal afflicted with a condition requiring the same for therapy, which comprises administering a dose of from 0.02 to 40 mg. per kilogram of body weight of said mammal of a compound selected from the group consisting of a compound having the formula

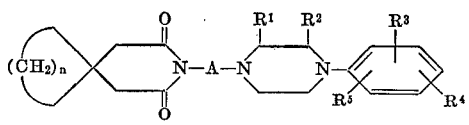

wherein
$R^1$ and $R^2$ are hydrogen or methyl,
$R^3$, $R^4$, and $R^5$ are hydrogen, alkyl of up to 4 carbon atoms, lower alkoxy of up to 4 carbon atoms, lower alkylthio of up to 4 carbon atoms, halogen, trifluoromethyl, nitro, amino, alkanoamido or alkylsulfonamido of up to 6 carbon atoms,
A is a divalent group linking the nitrogen atoms as shown through at least 2 carbon atoms and is selected from the group consisting of alkylene of 2 to 6 carbon atoms, oxalkylene of 4 to 6 carbon atoms wherein neither nitrogen-connecting carbon atom is linked to the oxygen atom thereof, and 2-butynylene,
$n$ is the integer 4 or 5
and the pharmaceutically acceptable acid addition salts thereof.

2. The process of claim 1 wherein 8-[2(4-o-methoxyphenyl-1-piperazinyl)ethyl] - 8 - azaspiro[4,5]decane-7,9-dione or a pharmaceutically acceptable acid addition salt thereof is employed and a tranquilizer, anti-emetic, hypothermic or antipyretic effect is elicited.

3. The process of claim 2 wherein a dose of from 0.5 to 25 mg./kg. of body weight of said mammal of 8-[2- (4 - o - methoxyphenyl-1-piperazinyl)ethyl] - 8 - azaspiro [4,5]decane-7,9-dione dihydrochloride is employed.

4. The process of claim 1 wherein 8-[4-(4-o-chlorophenyl-1-piperazinyl)butyl]-8 - azaspiro[4,5]decane - 7,9-dione or a pharmaceutically acceptable acid addition salt thereof is employed and a tranquilizer effect is elicited.

5. The process of claim 1 wherein 8-[4-(4-o-fluorophenyl - 1 - piperazinyl)butyl] - 8 - azaspiro[4,5]decane-7,9-dione or a pharmaceutically acceptable acid addition salt thereof is employed and a tranquilizer effect is elicited.

6. The process of claim 1 wherein 3 - [4-(4-o-methoxyphenyl - 1 - piperazinyl)butyl] - 3 - azaspiro[5,5]undecane-2,4-dione or a pharmaceutically acceptable acid addition salt thereof is employed and a skeletal muscle relaxant effect is elicited.

7. The process of claim 1 wherein 3-[2-(4-o-methoxyphenyl - 1 - piperazinyl)ethyl]-3-azaspiro[5,5]undecane-2,4-dione or a pharmaceutically acceptable acid addition salt thereof is employed and an anti-emetic effect is elicited.

8. The process of claim 7 wherein a dose of from 0.5 to 3.0 mg./kg. of body weight of said mammal of 3-[2-(4-o-methoxyphenyl - 1 - piperazinyl)ethyl] - 3 - azaspiro [5,5]undecane-2,4-dione hydrochloride is employed.

9. The process of claim 1 wherein 8-[3-(4-o-chlorophenyl-1-piperazinyl)propyl] - 8 - azaspiro[4,5]decane-7,9-dione or a pharmaceutically acceptable acid addition salt thereof is employed and an anti-allergic, anti-inflammatory, or capillary protectant effect is elicited.

10. A pharmaceutical composition in dosage unit form suitable for oral, parenteral, or rectal administration to a mammal comprising a pharmaceutical carrier and a sufficient amount of a compound to provide a daily dose of from 0.02 to 40 mg. thereof per kilogram of body weight of said mammal, said compound being selected from the group consisting of a compound having the formula

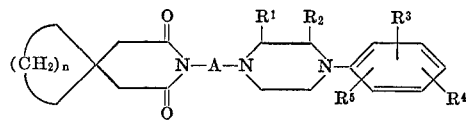

wherein
$R^1$ and $R^2$ are hydrogen or methyl,
$R^3$, $R^4$, and $R^5$ are hydrogen, alkyl of up to 4 carbon atoms, lower alkoxy of up to 4 carbon atoms, lower alkylthio of up to 4 carbon atoms, halogen, trifluoromethyl, nitro, amino, alkanoamido or alkylsulfonamido of up to 6 carbon atoms,
A is a divalent group linking the nitrogen atoms as shown through at least 2 carbon atoms and is selected from the group consisting of alkylene of 2 to 6 carbon atoms, oxalkylene of 4 to 6 carbon atoms wherein neither nitrogen-connecting carbon atom is linked to the oxygen atom thereof, and 2-butynylene,
$n$ is the integer 4 or 5
and the pharmaceutically acceptable acid addition salts thereof.

11. The composition of claim 10 containing 8-[2-(4-o-methoxyphenyl - 1 - piperazinyl)ethyl] - 8 - azaspiro [4,5]decane-7,9-dione or a pharmaceutically acceptable acid addition salt thereof.

12. The composition of claim 10 containing 8-[4-(4-o-chlorophenyl - 1 -piperazinyl)butyl] - 8 - azaspiro[4,5]-decane-7,9-dione or a pharmaceutically acceptable acid addition salt thereof.

13. The composition of claim 10 containing 8-[4-(4-o-fluorophenyl - 1 - piperazinyl)butyl] - 8 - azaspiro[4,5] decane-7,9-dione or a pharmaceutically acceptable acid addition salt thereof.

14. The composition of claim 10 containing 3-[4-(4-o-methoxyphenyl - 1 - piperazinyl)butyl] - 3 - azaspiro [5,5]undecane-2,4-dione or a pharmaceutically acceptable acid addition salt thereof.

15. The composition of claim 10 containing 3-[2-(4-o-methoxyphenyl - 1 - piperazinyl)ethyl] - 3 - azaspiro[5,5] undecane-2,4-dione or a pharmaceutically acceptable acid addition salt thereof.

16. The composition of claim 10 containing 8-[3-(4-o-chlorophenyl - 1 - piperazinyl)propyl] - 8 - azaspiro[4,5] decane-7,9-dione or a pharmaceutically acceptable acid addition salt thereof.

No references cited.

STANLEY J. FRIEDMAN, Primary Examiner